United States Patent [19]

Luoma et al.

[11] Patent Number: 4,929,517
[45] Date of Patent: May 29, 1990

[54] ELECTROCHEMICAL CELL ASSEMBLY

[75] Inventors: Warren L. Luoma, Manchester, Conn.; Ronald G. Martin, Monson, Mass.; Richard D. Breault, Coventry, Conn.

[73] Assignee: International Fuel Cells Corp., South Windsor, Conn.

[21] Appl. No.: 429,893

[22] Filed: Oct. 31, 1989

Related U.S. Application Data

[62] Division of Ser. No. 246,246, Sep. 19, 1988.

[51] Int. Cl.$^5$ .............................................. H01M 2/00
[52] U.S. Cl. ........................................ 429/34; 429/36
[58] Field of Search ................... 429/34, 35, 36, 41, 429/42

[56] References Cited

U.S. PATENT DOCUMENTS

| | | | |
|---|---|---|---|
| 3,867,206 | 2/1975 | Trocciola et al. | 429/35 |
| 4,652,502 | 3/1987 | Breault et al. | 429/36 X |
| 4,732,637 | 3/1988 | Dettling et al. | 429/36 X |

Primary Examiner—Anthony Skapars
Attorney, Agent, or Firm—Gene D. Fleischhauer

[57] ABSTRACT

A seal structure 58 between adjacent porous plates 18, 20 and a method of making the seal structure for an electrochemical cell are disclosed. Various construction details are developed which facilitate fabrication and assembly. In one embodiment, the adjacent porous plates are electrolyte reservoir plates joined together at a three-layer seal structure to form an integral assembly.

19 Claims, 3 Drawing Sheets

ELECTROCHEMICAL CELL ASSEMBLY

This is a division of application Ser. No. 246,246, filed on Sept. 19, 1988.

TECHNICAL FIELD

This invention relates to a seal for a porous plate of the type used in electrochemical cells, such as fuel cells for fuel cell powerplants. Although this invention was developed for use in the field of phosphoric acid fuel cell powerplants, the invention has application to other electrochemical cells employing such seals including fuel cells employing a base, or a solid polymer for an electrolyte.

BACKGROUND OF INVENTION

Fuel cell powerplants produce electric power by electrochemically consuming a fuel and an oxidant in one or more electrochemical cells. The oxidant may be pure oxygen or a mixture of gases containing oxygen, such as air. The fuel may be hydrogen.

Each fuel cell generally has electrodes for reacting the gases, such as an anode electrode for fuel and a cathode electrode for an oxidant. The cathode electrode is spaced from the anode electrode. A matrix saturated with electrolyte is disposed between the electrodes.

Each electrode includes a substrate. The substrate has a catalyst layer disposed on the side of the substrate which faces the electrolyte matrix. In some instances an electrolyte reservoir layer, such as an electrolyte reservoir plate, is on the other side of the substrate and is capable of providing electrolyte through small pores in the reservoir plate to the substrate. These electrolyte reservoir plates may have channels or passageways behind the substrate for carrying reactant gases, such as channels for carrying gaseous fuel to the anode and channels for carrying gaseous oxidant to the cathode. For example, these channels might extend between parallel ribs on the substrate side of the electrolyte reservoir plate.

A separator plate on the other side of the electrolyte reservoir plate provides a barrier to the transfer of electrolyte and prevents mixing of the fuel and oxidant gases in adjacent cells.

Another acceptable construction is to have the electrode substrate act both as an electrolyte reservoir plate and as an electrode substrate with channels on the separator side of the substrate.

U.S. Pat. No. 4,564,427 issued to Gruver entitled "Circulating Electrolyte Electrochemical Cell Having Gas Depolarized Cathode with Hydrophobic Barrier Layer" has a cathode which includes a porous plate for a substrate. A barrier layer of a fluorocarbon polymer containing carbon particles is bonded to the porous substrate plate and a catalyst layer is applied to the barrier layer. The barrier layer blocks the flow of electrolyte from passing through the catalyst layer to the substrate while permitting the flow of a reactant gas from the substrate through the barrier layer to the catalyst layer.

Other examples of electrolyte reservoir layers are shown in commonly owned U.S. Pat. Nos. 3,779,811; 3,905,832; 4,035,551; 4,038,463; 4,064,207; 4,080,413; 4,064,322; 4,185,145; and 4,374,906.

Several of these patents show the electrolyte reservoir layer as an electrode substrate. In addition to accommodating changes in acid volume due to electrolyte evaporation and changes in operating conditions of the cell, electrode substrates must satisfy several other functional requirements. For example, the substrate must be a good electrical conductor, a good thermal conductor and have adequate structural strength and corrosion resistance. The substrate must provide support to the catalyst layer and provides a means for the gaseous reactants to pass to the catalyst layer. Finally, the edges of the substrate are often required to function as a wet seal to prevent the escape of reactant gases and electrolyte from the cell.

One way to form a wet seal is to reduce the pore size of the edge region by densifying the edge region, such as through compression during substrate fabrication, and providing a liquid, such as electrolyte to the densified edge region. Densified substrate edge seals are described in commonly owned U.S. Pat. Nos. 4,269,642 and 4,365,008. Experience has shown that the seal density and pore size that can be practically obtained limits the edge seal cross pressure (or, commonly called the bubble pressure) to 3-4 psi.

Another approach to forming the seals is described in U.S. Pat. No. 3,867,206 entitled "Wet Seal for Liquid Electrolyte Fuel Cells" issued to Trocciola et al. which is commonly owned with the present invention. Another example is shown in commonly owned U.S. Pat. No. 4,259,389 issued to Vine entitled "High Pressure-Low Porosity Wet Seal". As discussed in Vine, a seal may be formed in the edge seal region of a porous plate by using a powder filler to provide a denser packing to the region which reduces porosity.

An improved edge seal is described in copending, commonly owned, U.S. Pat. No. 4,652,502 entitled "Porous Plate for an Electrochemical Cell and Method for Making the Porous Plate" filed by Richard D. Breault, a coinventor of this application, and John D. Donahue. In this construction, the electrolyte reservoir layer is a substrate or an electrolyte reservoir plate. The edge seal regions of such porous plates are filled with a high solids, low structure powder which is introduced into the region in suspension form under pressure. The pores of the seal are formed within the edge of the porous plate upon removal of the liquid from the suspension. Such a seal is able to tolerate transient cross-pressure which are an order of magnitude larger than the cross-pressures encountered in the edge region during the normal operation.

Generally, a stack of fuel cells and separator plates are used in performing the electrochemical reaction. As a result of the electrochemical reaction, the fuel cell stack produces electric power, a reactant product, and waste heat. The stack includes a cooling system for removing the waste heat from the fuel cell stack. The cooling system has a coolant and conduits for the coolant disposed in cooler holders to form coolers within the stack. Heat is transferred by the cooler holders from the fuel cells to the conduits and from the conduits to the coolant.

The cooler holder must be electrically and thermally conductive and may be permeable to gas. An example of such a cooler holder is shown in U.S. Pat. No. 4,245,009 issued to Guthrie entitled "Porous Coolant Tube Holder for Fuel Cell Stack". Alternatively, the cooler holder might be impermeable to gas. An example of such a cooler holder is shown in U.S. Pat. No. 3,990,913 issued to Tuschner entitled "Phosphoric Acid Heat Transfer Material". In Tuschner, the cooler holder serves the double function of cooler holder and separator plate.

As discussed, separator plates prevent the mixing of the fuel gas, such as hydrogen, disposed on one side of the separator plate, with an oxidant, such as air, disposed on the other side of the separator plate. Separator plates must be highly impermeable to gases such as hydrogen and oxygen, and thermally and electrically conductive to pass heat and electrical current through the fuel cell stack. In addition, separator plates must also tolerate the severe corrosive atmosphere formed by the electrolyte of the fuel cell, such as hot phosphoric acid, while preventing electrolyte transfer from cell to cell. Finally, separator plates, like cooler holders, must be strong, particularly in terms of flexural strength, which is a measure of the ability of the separator plate to withstand high pressure loads, differential thermal expansion of mating components, and numerous thermal cycles without cracking or breaking.

An example of a method for making separator plates for electrochemical cells is discussed in U.S. Pat. No. 4,360,485 issued to Emanuelson et al., the disclosure of which is hereby incorporated by reference. In this method, the separator plate is formed by molding and then graphitizing a mixture of preferably 50 percent high purity graphite powder and 50 percent carbonizable thermosetting phenolic resin. In particular, Emanuelson discusses forming a well blended mixture of the appropriate resin and graphite powder. The mixture is then distributed in a mold. The mold is compacted under pressure and temperature to melt and partially cure the resin and to form the plate. Typically, such a plate must be heated to for example, to one-thousand degrees (1000° C.) Celsius to convert the phenolic resin to carbon and then graphitized by heating to two-thousand seven hundred (2700° C.) Celsius to provide required corrosion resistance.

The separator plate, because it is a separate component, adds complexity and expense to the manufacture of a fuel cell stack. Efforts have been directed at eliminating such components by providing a seal structure within the porous plates. One example of such a seal structure is shown in U.S. Pat. No. 4,756,981 issued to Breault et al. entitled "Seal Structure for an Electrochemical Cell". Breault discloses a seal region for adjacent porous plates which performs the function of a separator plate with a hydrophobic liquid barrier and a hydrophillic gas barrier.

Other efforts have been directed at eliminating such components by bonding together adjacent plates. For example, a gas separator disposed between the adjacent cathode and anode porous members might be a gas impermeable layer as discussed in U.S. Pat. No. 4,129,685 issued to Damiano entitled "Fuel Cell Structure". In Damiano, two porous members may provide a flow path for the flow of a reactant gas and may be bonded to each other by the gas separator layer that is a thick or thin coating.

U.S. Pat. No. 4,505,992 issued to Dettling et al. entitled an "Integral Gas Seal for Fuel Gas Distribution Assemblies and Method of Fabrication" is another example of such constructions. The gas distribution plate members are bonded together at their interface with a sealant material which extends into the pores of at least one of said porous plates. The sealant material may be selected from the group consisting of fluorinated ethylene-propylene, polysulphone, polyethersulfone, polyphenylsulphone, perfluorinated alkoxy tetrafluoroethylene, and mixtures thereof.

Dettling describes a fabrication process for forming the integral assembly of the two porous plates. The process includes providing two porous plates and a layer of sealant material between the plates. The plates and layer of sealant material are subjected to pressure and elevated temperature to melt the layer. As a result, the material in the layer impregnates the porous plates as it melts flowing into the pores to bond the plates together and to seal each plate along the interface against gas transfer.

As noted in Dettling, the pressure applied to the two carbon plates must be great enough to force the facing surfaces of the plates together but not so great as to damage the underlying structure of the plates.

The above art notwithstanding, scientists and engineers are still seeking to develop seal structures for use between the porous plates of electrochemical cells such as the integral separator plates or other plates in abutting contact.

DISCLOSURE OF INVENTION

According to the present invention, an electrochemical cell assembly includes a pair of gas porous plates joined together by a layer of binder and compacted particles disposed between the plates, such that the binder extends into the plates to form a bond, the boundaries of the layer and the porous plates are merged, and the layer passes heat and electrical charge while blocking the passage of liquid and gases between the plates. In accordance with one embodiment of the present invention, the electrically and thermally conductive particles are carbon and the density of carbon particles in binder of the layer between the plates is greater than the density of carbon particles in binder of each of the layers in the adjacent porous plates.

According to the present invention, a method of forming an electrochemical cell assembly includes: disposing a binder and particles between adjacent porous plates; heating and pressing the porous plates against the binder and carbon particles to cause the binder to flow into the porous plates and to compact carbon particles in the layer between the porous plates; and, cooling the flowable binder under pressure to form an integral assembly.

A primary feature of the present invention is a pair of gas porous plates formed of electrically and thermally conductive particles. A layer of binder and particles extends between the plates. The binder extends into each of the plates to form adjacent layers of particles in binder. Another feature is the relative position of the boundaries of the layers of particles in binder. In one embodiment, each boundary of the layer between the plates is merged with the boundary of the layer in the adjacent plate. In one particular embodiment, the particles are graphite and the intermediate layer has a concentration of particles in binder which is greater than the density of particles in binder in the layers of the adjacent plates.

The principal advantage of the present invention is the gas impermeability of a seal structure which results from the compacted, particle filled, layer of binder (third layer) and the merged boundaries between the third layer and the filled layers in the adjacent porous plates. Still another advantage is the reduced cost and complexity of the fuel cell in manufacture and use which results from forming adjacent porous plates as an integral assembly by bonding together two electrolyte reservoir plates with a layer. In one particular embodiment, adjacent electrolyte reservoir plates are joined and sealed without the use of a separate plate and are formed as a one-piece assembly. An advantage of the method making the assembly is the filtering effect which is provided by the adjacent porous plates, forcing the carbon particles disposed throughout the intermediate layer into a compacted layer while providing a binder between the third layer and the adjacent porous plates. Another advantage is the immobilized bonded structure which results from the step of cooling the plates while applying pressure so that the plates and binder are cooled to a temperature which insures that separation does not occur. Finally, other advantages of the method are the many different approaches which are available for disposing the third layer between the porous plates which enables adaptation of the manufacturing process to a variety of high speed operations. An example is the method of forming a continuous sheet of graphite disposed in binder through molding a billet and skiving the continuous sheet from the billet.

The foregoing features and advantages of the present invention will become more apparent in light of the following detailed description of the best mode for carrying out the invention and the accompanying drawings.

BEST MODE FOR CARRYING OUT THE INVENTION

Figure 1:
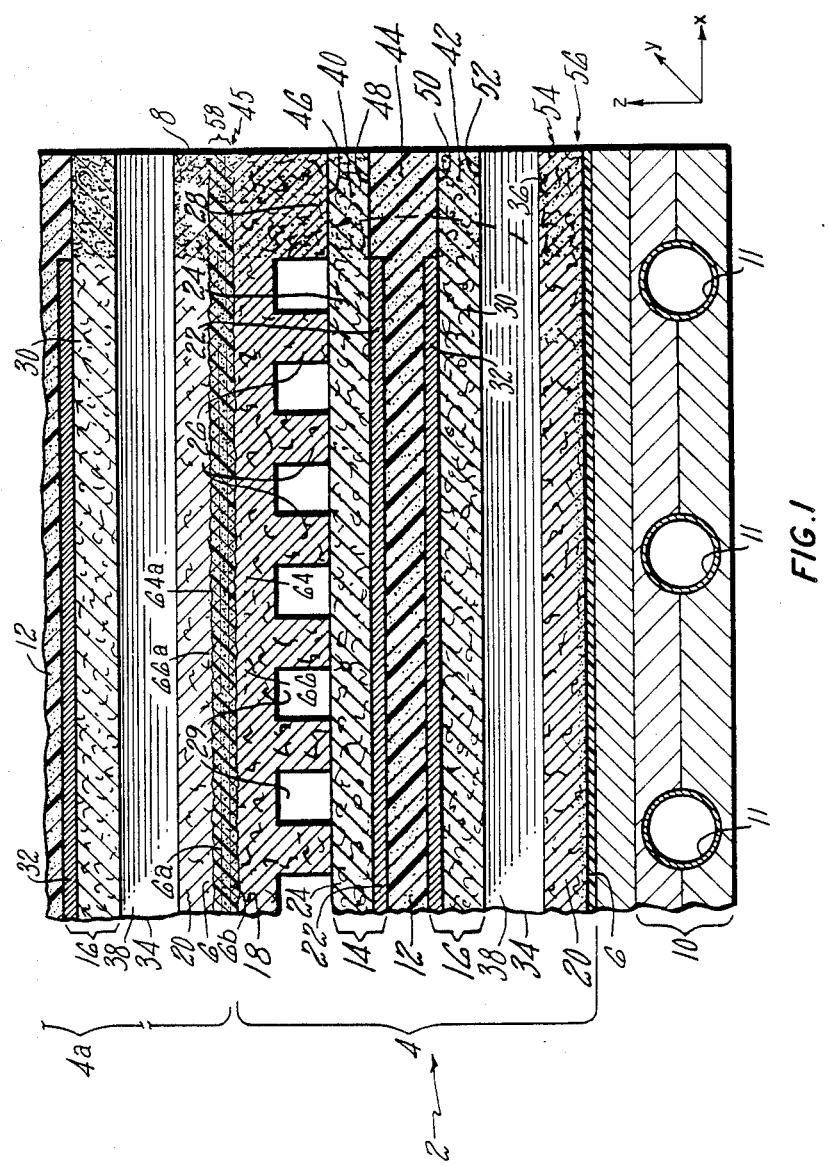
FIG. 1 is a cross-sectional view of a portion of an electrochemical cell stack having a pair of gas porous plates joined together by a layer of binder that contains compacted particles.

FIG. 1 is a cross-sectional view of an embodiment of the present invention which is employed in an electrochemical cell assembly such as a fuel cell powerplant. A portion of a fuel cell stack 2 of such a powerplant is shown.

The fuel cell stack 2 includes one or more fuel cells as represented by the fuel cell 4 and a portion of the adjacent cell 4a. Each fuel cell is box-like having two planar faces, such as the planar surface 6; and, having sides or edges, such as four edges represented by the single edge 8. Cooler holders, represented by the single cooler holder 10, are spaced at intervals between sets of fuel cells. The cooler holders are adapted to receive conduits 11 for a coolant.

Each fuel cell includes an electrolyte retaining matrix 12 disposed between an anode electrode 14 and a cathode electrode 16. An electrolyte reservoir plate 18 is adjacent the anode and an electrolyte reservoir plate 20 is adjacent the cathode. The term "plate" is used in its broad sense and includes plates that are curved or flat and porous or solid. The particular electrochemical cell shown uses phosphoric acid as the electrolyte.

Each anode electrode 14 has a catalyst layer 22 and an electrode substrate 24 which supports the catalyst layer. The substrate is a porous plate and acts as a gas permeable reservoir layer for the electrolyte. The catalyst layer is bonded to the substrate and is formed of catalyst particles bonded together with a hydrophobic material such as polytetrafluoroethylene. One such catalyst is platinum supported on carbon particles.

The porous electrolyte reservoir plate 18 has ribs 26 and an edge portion 28. The ribs are spaced apart leaving passages 29 for fuel therebetween which extend laterally across the plate in the Y-direction to one of the edges 8 (not shown) of the cell. A suitable fuel, such as hydrogen, is flowed through the passages 29 and the substrate reservoir layer 24 to the catalyst layer 22.

Electrolyte transfer between the matrix 12 and both the electrolyte reservoir plate 18 and the reservoir layer 24 occurs directly through the pores of the catalyst layer 22 which is partially hydrophilic. The catalyst layer may have holes to aid in this liquid transfer. This distribution of electrolyte within the cell occurs as a result of the capillarity of porous structures (that is, the surface tension phenomenon of the gas-liquid interface) which causes the porous structure to develop capillary forces. The smaller the pore, the larger the capillary force and the greater the liquid retention capability.

The cathode electrode 16, like the anode electrode 14, has a substrate 30 and a catalyst layer 32. The catalyst layer is bonded to the substrate.

The electrolyte reservoir plate 20 adjacent the cathode has a plurality of ribs, as represented by the single rib 34. The ribs are spaced apart to define passages 38 for the oxidant which extend laterally in the X-direction across the plate to the edge 8 (shown). These passages generally extend perpendicular to the passages 29. An oxidant, such as the oxygen contained in air, is flowed through these passages 29 between the substrate reservoir layer 30 and the electrolyte reservoir plate 20 and from the passages 29 through the substrate to the catalyst layer 32.

Each porous plate having a reservoir layer is formed of relatively small fragments (particles) of a material or materials that are electrically and thermally conductive and are compatible with the environment. Such particles include carbon, graphite, and boron carbide.

Because plates having reservoir layers are porous, each such plate has a peripheral seal region, such as the seal regions which block the loss of gases from passages 29. For example, the anode substrate 24 has a peripheral seal region 40, the cathode substrate 30 has a peripheral seal region 42, and the electrolyte reservoir plates 18 have peripheral seal regions in the edge region 28. In the edge region 28, the seal region extends parallel to the endmost passage of the passages 29. While the edge region of the cathode electrolyte reservoir plate 20 is not shown, the seal region extends parallel to the endmost passage of the passages 34.

Each seal region is filled with a sealing material to adapt the seal region to form a seal with the electrolyte. The sealing material comprises an inert powder selected from the group consisting of carbon, graphite, silicon carbide and mixtures thereof. The powder has a particle size which is less than one micron and a low structure to facilitate dispersal of the powder to the original prime particles to aid in forming a high solid, low viscosity suspension. The sealing material increases the density of the seal region of the substrate thus decreasing the pore size and porosity of the plate.

Thus, substantially all the pores (that is, the pore size distribution) of the edge region are smaller than substantially all the pores (the pore size distribution) in a region spaced away from the edge region, such as the region in the ribs 26. Because the pores of the seal region are smaller than the remainder of the plate, the entire volume of the seal region remains essentially completely filled with electrolyte and no path for gas extends through the seal as long as the pore size of the edge region is smaller than the pore size of the matrix or, if larger, as long as the matrix 12 and edge region are filled with electrolyte. Liquid seals are thereby formed by sandwiching the sealing portions between the edge portions of the upper adjacent structure at 45 and the edge portion of the lower adjacent structure at 54. Thus, these liquid seals extend to the locations 45, 46, 48, 50, and 52.

The capillarity resulting from the surface tension of liquid in porous structures, such as electrolyte in the seal region, causes capillary forces which resist movement of the liquid electrolyte from the pores of the seal region. The smaller the pore, the larger the capillary force at the gas-liquid interface and the larger the ability to resist differences in pressure between any reactant gas and the exterior of the cell. By reason of the method used to fill the seal formed in the substrate can resist steady state gas pressures and even transient differences in pressure which can range between five and thirty pounds per square inch, absolute (5 and 30 psia).

A seal structure 56 is provided to the cell 4 and the adjacent cooler holder at face 6 and extends laterally in the x-y directions. A laterally extending seal structure 58 is provided to the adjacent pair of cells 4, 4a. The seal structure extends through the faces 6a and 6b and is formed of three layers of particles and binder as discussed with respect to FIG. 2. The seal structure extends laterally to the edges 8 of the porous plates to provide means for blocking the passage of electrolyte and of reactant gases from fuel cell 4 and fuel cell 4a. Thus, the seal structure 58 blocks the leakage of gaseous reactants and electrolyte through the faces 6a and 6b in a direction Z which is generally normal (perpendicular) to the lateral directions X and Y.

Figure 2:
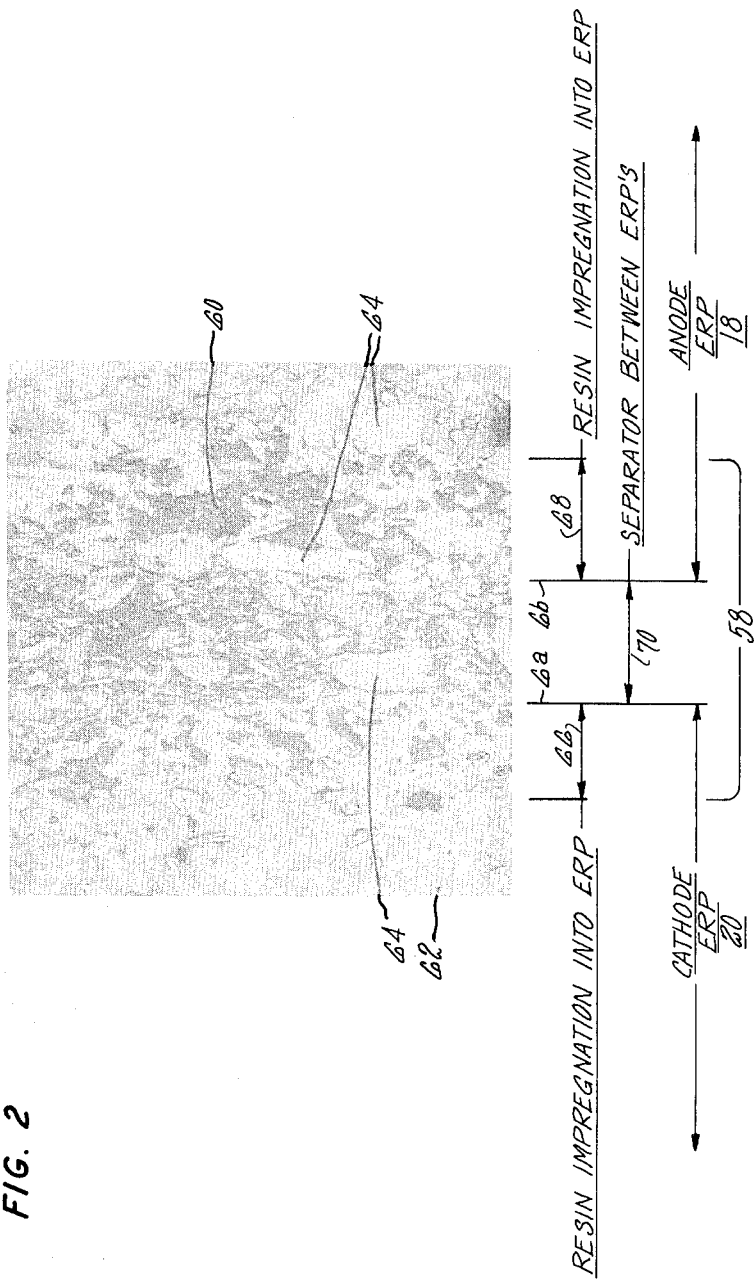
FIG. 2 is a photomicrograph at one hundred times magnification of the layer of binder and compacted particles.

FIG. 2 is a photomicrograph at a hundred times magnification of the seal structure 58 shown in FIG. 1. This figure shows portions of the gas porous electrolyte reservoir plate 18 for the anode and the gas porous electrolyte reservoir plate 20 for the cathode.

The seal structure 58 includes a layer of polymer binder which appears as black areas 60 in the photomicrograph, and potting compound which appears as gray areas 62. The potting compound is added to the porous plates for supporting the carbon particles of the plate during the polishing of the samples prior to making the photomicrograph and is not part of the component. Carbon particles disposed in the plate and carbon particles disposed between the plates in the binder appear as irregularly shaped objects 64 lighter in color than the polymer binder 60 and lighter in color than the potting compound 62.

The binder is disposed between the plates 18, 20 and extends into the void structure of the adjacent porous plates. The binder, a single continuous layer of material, forms three different layers with boundaries defined by the particles in each layer. The boundaries are merged at the interface between the layers. In particular, the binder extends into the adjacent porous plates 18, 20 and forms layers of carbon particles and binder in the plates such as the first layer 66 and the second layer 68. The binder between the plates forms the third layer 70 of carbon particles and binder.

Each layer has a distribution of carbon particles in binder. The amount of carbon particles present is measured in grams per cubic centimeter. This amount is referred to as the concentration of carbon particles in binder. In the porous plates, the concentration of carbon particles in binder is in the order of one (1.0) gram per cubic centimeter of volume. The third layer between the porous plates has a concentration in the order of one and two tenths to one and four tenths (1.2 to 1.4) grams per cubic centimeter. Thus, the concentration of carbon particles in the third layer is greater than the concentration of carbon particles in the layers of the porous plates. As can be seen from the photomicrograph, within the third layer the concentration of carbon particles in binder is greater at the interfaces between the third layer and the adjacent layers in the porous plates than on the interior of the third layer.

In the acid electrolyte environment of the present embodiment, the carbon particles are graphitized and are preferably graphite for corrosion resistance having a particle size which is equal to or greater than two microns, a low surface area (that is, less ten (10) square meter per gram, a low porosity), (that is, less than or equal to twenty (20) percent), and a high bulk density (that is, greater than seven-tenths (0.7) of a gram per cubic centimeter.

In the alkaline electrolyte environment of base fuel cells, such as potassium hydroxide cells, or in the environment of solid polymer electrolyte cells, other particles might be used which are of a material which is compatible with the electrolyte, such as nickel for a potassium hydroxide cell.

Figure 3:
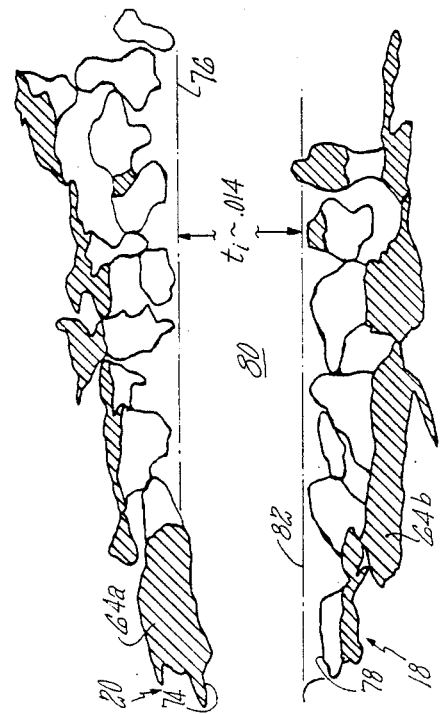
FIG. 3 is a schematic representation of porous plates similar to the porous plates shown in FIG. 2 showing the relative orientation of the particles in the plate to the sectioned portion of each particle as it might appear in a photomicrograph.

FIG. 3 is a schematic representation of portions of two porous electrolyte reservoir plates similar to the plates shown in FIG. 2 prior to fabrication of the assembly. Prior to fabrication, the plates are separated by a distance of about fourteen (14) mils leaving a space therebetween and a mixture of particles in binder is disposed in the space between the plates. The binder and particles between the plates are not shown for the sake of clarity.

As shown in FIG. 3, each porous plate has electrically and thermally conductive particles, such as the carbon cathode particles 64a or the carbon anode particles 64b. The particles are joined together leaving a void structure therebetween. Because the particles are three dimensional objects and the photomicrograph is a two-dimensional view of the particles, the particles shown in the photomicrograph are represented with sectioned portions to show the portions of each particle in the plane of the photomicrograph and are represented with portions in full to show the portions of each particle which extend below the plane of the photomicrograph.

Each porous plate has a surface and a boundary on the surface which is defined by the particles of the plate. For example, the cathode electrolyte reservoir plate is a first porous plate 20 having a first surface 74. The first surface has a boundary which is defined by the carbon particles 64a, as represented by the boundary line 76 extending in phantom. The anode electrolyte reservoir plate 18 is a second porous plate having a second surface 78 which faces the first porous plate. The second surface is spaced from the first surface leaving a region 80 therebetween. The second surface of the second porous plate has a boundary which is defined by the particles 64b in the porous plate as represented by the phantom line 82.

Figure 4:
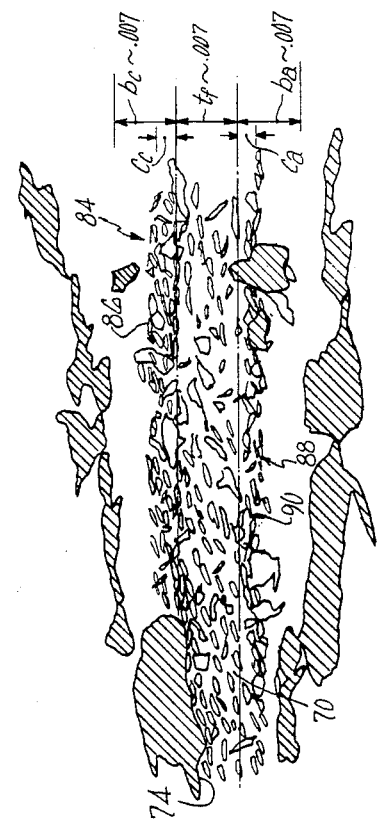
FIG. 4 is a schematic representation of the two porous plates of FIG. 3 showing the relationship of the assembled plates to the particles disposed in the binder.

FIG. 4 shows the relationship of the particles of the third layer 70 to the particles between the porous plates. After fabrication, the two plates will be adjacent to the third layer and spaced apart by a final distance $t_f$ of approximately seven (7) mils. Because the binder extends into the adjacent plates, the immobilized particles in the adjacent plate displace the smaller particles and the binder causing the binder to extend into the plates a distance $B_a$ and $B_c$ such that the summation of the final thickness $t_f$ between the plates and the distance $B_a$ and $B_c$ is greater than the initial thickness $t_i$. The binder is not shown for the sake of clarity. Because the method of fabrication forces the smaller particles of the third layer together, the third layer has a concentration of particles at the boundary which extend a distance $C_a$ and $C_c$, for example, of about two mils over the adjacent boundaries of the porous plates on either side of the third layer. As noted, the particles in the third layer are in greater concentration in these regions of the third layer than in the interior of the third layer.

More particularly, the third layer of binder is filled with carbon particles and has a first surface 84 adjacent to the first surface 74 of the first porous plate 20. The first surface 84 has a boundary 86 defined by the particles of the third layer. The boundary 86 is merged with the boundary 76 of the first porous plate.

The third layer has a second surface 88 adjacent to the second surface 78 of the second porous plate 18 and a boundary 90 defined by the particles of the third layer. The boundary 90 is merged with the boundary 82 of the second porous plate. The boundaries are considered merged because particles from the third layer which define the boundary of the third layer extend over the particles from the adjacent layers which form the boundaries for those layers. As a result, the boundaries of each layer extend past the boundaries of the adjacent layer.

The method of making the assembly includes the steps of forming the two porous plates, such as electrolyte reservoir plates, which are to be joined together. These steps are well known and include forming graphite and phenolic resin precursor structures, carbonizing and graphitizing the structures to form the porous electrolyte reservoir plates, microgrinding the reservoir plates to uniform thickness, trimming the plates and then vulcanizing the plates. An example of such a process is shown in U.S. Pat. No. 4,185,145 and U.S. Pat. No. 4,219,611 which are issued to Breault and are entitled "Fuel Cell Electrolyte Reservoir Layer and Method for Making".

A mixture of graphite powder and a resin is formed for disposition between the porous plates. The mixture of graphite powder and the resin, such as Teflon resin or other suitable resins, is dry blended for about twenty minutes for a fifty pound batch using a Littleford mixer—Model FM-130 or the equivalent. Satisfactory powders have been found to be Carbon/Graphite Group Inc. (CGGI) Grade 60 powder, sieved through 140 mesh screen to remove all particles above 105 microns. The mean particle size is approximately thirty-five microns. Another suitable graphite powder is CGGI Grade 90 powder. Both of these powders are available from the Carbon/Graphite Group Inc., St. Marys, Pa. 15857. Other graphite powders found satisfactory are: Grade 9033 Desulco graphite powder available from the Superior Graphite Company, Chicago, Ill.; and, Grade 200-42 graphite powder available from Joseph Dixon Crucible Co., Jersey City, N.J. 07303. Teflon powders may include fluorinated ethylene propylene (FEP Teflon) powder such as grade TL-120 available from the LNP Corporation, Malvern, Pa. Another suitable Teflon powder is perfluoroalkoxy resin (PFA Teflon) powder available as Teflon-P powder grade number 532-5010 from the E.I. DuPont DeNemours & Co., Wilmington, Del. 19898.

After forming the graphite-Teflon powder mixture, the mixture is deposited on an electrolyte reservoir plate, the mixture consisting essentially of graphite powder and the Teflon binder. Several methods of deposition are possible. The powder mixture may be deposited in the dry condition by (1) mechanical spreading using a doctor blade, (2) vacuum deposition of a fluidized powder, (3) passing the part under a rotary brush feeder. The powder mixture may also be made into a slurry by use of an appropriate vehicle and either slip cast, screen printed, or filtered onto the part, and then dried to remove the vehicle.

The total amount of material deposited is in the range of 0.2 to 0.6 grams per square inch. The powder mixture can be cold compacted by rolling to improve its green strength which facilitates handling.

An alternate method of disposing the graphite-Teflon powder mixture on the electrolyte reservoir plate is to use a manufacturing process which involves disposing a sheet of suitable material between the reservoir plates. The sheet is obtained by first forming a billet of suitable materials and then skiving sheets from the billet. The billet is formed by molding blended powders into a cylindrical shape. The steps of forming the billet are familiar to one skilled in the art and include blending the graphite and FEP or PFA Teflon powders, preforming the billet by compacting the powder under a pressure of at least one-thousand (1000) pounds per square inch, sintering the preformed billet above the melt point of the resin under a pressure of at least one-thousand (1000) pounds per square inch to mold the billet to a density of greater than one and eight-tenths (1.8) grams per cubic centimeter. And, finally the densified billet is cooled under pressure to below the melt point of the resin. Thereafter, a continuous sheet is skived from the billet to form a layer of material which is disposed between the electrolyte reservoir plates.

The two electrolyte reservoir plates and an intermediate layer of graphite powder and Teflon powder whether as a powder mixture or as a continuous sheet are placed together. The two plates and the intermediate layer are then laminated to form a unitized electrolyte reservoir plate—integral separator plate assembly.

The process uses the following steps. First, the assembly of the two plates and graphite-resin powder is heated to five hundred and eighty (580) to six hundred and fifty (650) degrees Fahrenheit at a pressure of two hundred (200) to three hundred (300) pounds per square inch for five to fifteen (5 to 15) minutes. This temperature and pressure forces the binder through the boundaries of the adjacent porous plates into the void structure and around particles in the adjacent porous plates. As the binder moves into the plates, the binder forms layers of particles in binder in the adjacent plates as well as forming the third layer of binder and particles between the plates. As the porous plates move closer to each other due to pressure and the binder moving into the porous plates, the porous plates act as filters pushing before the plates the fine particles that are in the intermediate layer. This causes the fine particles in the intermediate layer to compact with an increased concentration along the surface of either side of the intermediate layer. After the binder has moved into the porous plates and the layer between the plates has been compacted, the assembly is cooled to about five hundred (500) degrees Fahrenheit or less while maintaining pressure. Alternatively, the assembly is transferred quickly to a cold press while above a temperature of five hundred and fifty (550) degrees Fahrenheit, the melting point of the FEP Teflon binder, and quenched under pressure. In either event the binder is frozen in position while still under pressure.

A dual-belt press may be used to laminate the assemblies on a continuous basis. In this type of operation each side of the press has a belt which moves continuously with a laminate of electrolyte reservoir plate and layers therebetween. After lamination, the assembly is checked for gas permeability and for electrical resistance.

If the assembly is acceptable, edge seals are formed in the edge to prevent outboard gas leakage. These may be formed by impregnating the edge seal after lamination with fine particle graphite to create a wet seal. Alternatively, the edge seals may be introduced into the plate prior to lamination or by using solid seals which are bonded in place during the laminating process. Gas flow channels are then machined in the electrolyte reservoir plate/integral separator plate assembly. Finally the backside seal material is applied in the wet seal areas. The intermediate layer and adjacent layer of the assembly now exist as shown in FIG. 4 and is similar to the cross-sectional photo micrograph of the similar layers shown in FIG. 2.

Assemblies of two porous plates with three layers at the interface between the plates have been fabricated and characterized for gas leakage and electrical resistance before and after heat aging. Then the assemblies have been heat aged at four-hundred and forty (440) and (500) five hundred degrees Fahrenheit with periodic thermal cycling to room temperature. The results of these tests are shown in Tables 1 and 2 for various compositions which have been evaluated. These tables show the effect on important characteristics of the range in composition of the weight percentage of graphite, the types of graphite and the types of Teflon that are used making the assembly. The results show that compositions with twenty-five (25) to forty (40) weight percent graphite powder with a mean graphite particle size of approximately thirty-five (35) microns and a particle size that ranges between two to one-hundred and five (2–105) microns appear optimum in that both the low gas permeability in the dry condition (that is, less than 0.06 cc/ft$^2$ sec) and an IR or voltage characteristic which is less than or equal to two and one-half millivolts per one hundred amps per square foot (100 ASF) across the bonded layer are acceptable.

The gas permeability characteristic is measured by applying a cross pressure of eight (8) inches of water to the porous plates and measuring the permeability of the structure to gas as it passes through the dry structure. The gas that is used is nitrogen.

The IR or voltage characteristic is measured by compressing the porous plates between graphite plates to a pressure of 100 psi, passing a D.C. current of 100 ASF, and measuring the D.C. voltage drop across the porous plates.

As mentioned earlier the minimum particle size is two microns and the small particles can be seen in the edge region adjacent to the layers in the porous plates. The concentration of small particles at the interface between layers and the merged boundary layers decreases the IR characteristic of the integral assembly. This results from the use of a mixture of graphite and Teflon powder between the electrolyte reservoir plates which has an excess of Teflon powder in comparison to the final composition of the third layer. The excess Teflon binder is forced from between the plates under pressure and driven into the pores of the adjacent porous plates during the high pressure, high temperature laminating process. This results in a compacted layer of carbon powder in graphite form between the porous plates that contains the amount of Teflon material needed to fill the void volume but with no excess Teflon material to cause high electrical or thermal resistance. And, this method also results in merged boundaries between the layers with a high concentration of small particles at the boundaries further improving the electrical and thermal conductivity of the layers.

In one particular configuration, the porous plates were about twenty mils apart at the beginning of the assembly process. At completion of the fabrication process, the distance between the porous plates was approximately ten (10) mils. The mean particle size $P_m$ was less than or equal to one-half of the distance t between the plates ($P_m \leq t/2$). This is important because mean particle sizes larger than that appear to adversely effect the ability of the three layers to block the leakage of gas or electrolyte through the layers although the plates may still be functional for some applications. Preferably, the mean particle size is approximately 20% of the distance t and the layer is approximately one-third by weight graphite particles. As noted, good results have been obtained using fluorinated ethylene propylene (FEP Teflon) and perfluoroalkoxy (PFA Teflon) resin and mixtures of these.

Although the invention has been shown and described with respect to detailed embodiments thereof, it should be understood by those skilled in the art that various changes in form and detail thereof may be made without departing from the spirit and the scope of the claimed invention.

TABLE 1

| | | | TYPES OF GRAPHITE | | | | |
| --- | --- | --- | --- | --- | --- | --- | --- |
| | | | | After 440° F. Aging | | After 500° F. Aging | |
| | Loading (g/in$^2$) | IR (2) (mv) | Gas Perm (3) (cc/ft$^2$-s) | IR (2) (mv) | Gas Perm (4) (cc/ft$^2$-s) | IR (2) (mv) | Gas Perm (5) (cc/ft$^2$-s) |
| 25% (1) Sieved CCGI Grade 60 75% FEP | .30 | 1.0 | No Leakage | — | .005 | — | — |
| 33.3% (1) | .41 | 1.8 | No Leakage | .97 | No Leakage | 1.85 | No Leakage |

TABLE 1-continued

TYPES OF GRAPHITE

| | Loading (g/in²) | IR (2) (mv) | Gas Perm (3) (cc/ft²-s) | After 440° F. Aging | | After 500° F. Aging | |
|---|---|---|---|---|---|---|---|
| | | | | IR (2) (mv) | Gas Perm (4) (cc/ft²-s) | IR (2) (mv) | Gas Perm (5) (cc/ft²-s) |
| Sieved CCGI Grade 60 66.6% FEP 40% (1) | .41 | 1.9 | No Leakage | 1.28 | No Leakage | — | — |
| Sieved CCGI Grade 60 60% FEP 33.3% | .41 | 2.9 | — | 1.38 | .006 | 2.64 | .003 |
| CCGI Grade 90 66.6% FEP 25% | .33 | 6.0 | No Leakage | — | .002 | — | — |
| Desulco Grade 9033 75% FEP 40% | .41 | 9.9 | No Leakage | 2.62 | No. Leakage | — | — |
| Desulco Grade 9033 60% FEP 40% | .30 | 6.0 | No Leakage | 2.55 | No Leakage | — | — |
| Dixon Grade 200-42 60% FEP | | | | | | | |

(1) Particles > 105 microns removed
(2) mv/100 ASF at 100 psi
(3) N₂ at 8" H₂O cross-pressure
(4) 10 Thermal Cycles from 70° C. to 400° F.
(5) 11 Thermal Cycles from 70° C. to 500° F.

TABLE 2

Range of Composition

| Weight % (1) Graphite | Weight % Resin | Loading (g/in²) | Laminating (2) Temp | IR (3) (mV) | Gas (4) Permability (cc/ft²-s) | After 440° F. Aging (5) | | After 500° F. Aging (6) | |
|---|---|---|---|---|---|---|---|---|---|
| | | | | | | IR (3) (mV) | Gas Permability (4) (cc/ft²-s) | IR (3) (mV) | Gas Permability (4) (cc/ft²-s) |
| 5 | 95 FEP | .30 | 600° F. | .66 | No Leakage | .86 | 0.183 | | |
| 10 | 90 FEP | .30 | 600° F. | .58 | No Leakage | .81 | 0.057 | | |
| 25 | 75 FEP | .30 | 600° F. | .99 | No Leakage | — | 0.005 | | |
| 33 | 66 FEP | .38 | 600° F. | 1.81 | No Leakage | 1.01 | No Leakage | | |
| 40 | 60 FEP | .41 | 600° F. | 2.17 | No Leakage | 1.28 | No Leakage | | |

Types of Teflon

| | | | | | | | | | |
|---|---|---|---|---|---|---|---|---|---|
| 33 | 66 FEP | .41 | 600° F. | 2.02 | No Leakage | | | | |
| 33 | 66 FEP | .41 | 600° F. | 1.38 | | .97 | No Leakage | | |
| 33 | 66 FEP | .40 | 600° F. | 2.00 | | | | 1.85 | No Leakage |
| 33 | 66 PFA | .39 | 625° F. | .69 | .023 | | | | |
| 33 | 66 PFA | .39 | 625° F. | .68 | | .65 | .114 | | |
| 33 | 66 PFA | .39 | 625° F. | .70 | | | | .63 | .137 |

(1) CCGI Carbon Grade 60 with Particles Above >105 microns removed.
(2) Pressure was 250 psi
(3) mv/100 ASF at 100 psi
(4) N₂ at 8" H₂O cross-pressure
(5) After 10 Thermal cycles from 70° F. to 440° F.
(6) After 11 Thermal cycles from 70° F. to 500° F.

We claim:

1. An electrochemical cell assembly which includes a pair of adjacent gas porous plates having electrically and thermally conductive particles joined together leaving a void structure therebetween, the plates being joined together to form an integral structure that is electrically and thermally conductive and which includes a region that blocks the flow of gas and electrolyte, wherein the improvement comprises:

a first porous plate having electrically and thermally conductive particles which are joined together leaving a void structure therebetween, the first plate having a first surface which has a boundary defined by the particles;

a second porous plate having electrically and thermally conductive particles which are joined together leaving a void structure therebetween, the second plate having a second surface which has a boundary defined by the particles, the second surface being spaced from the first surface leaving a region therebetween; and, binder which is disposed in the region between the plates, the binder extending through the boundary of the first plate into the void structure to form a first layer of particles in binder in the first plate, and extending through the boundary of the second plate into the void structure to form a second layer of particles in binder in the second plate;

wherein electrically and thermally conductive particles are disposed in the region between the plates in the binder to form a third layer of particles in binder, the third layer having a first surface adjacent to the first surface of the first porous plate and a boundary defined by the particles of the third layer which is merged with the boundary of the first porous plate, the third layer having a second surface adjacent to the second surface of the porous plate and a boundary defined by the particles of the third layer which is merged with the boundary of the second porous plate.

2. The electrochemical cell assembly of claim 1 wherein the first layer has a first concentration of particles in binder, the second layer has a second concentration of particles in binder and the third layer has a third concentration of particles in binder which is greater than the concentrations of the first and second layers.

3. The electrochemical cell assembly of claim 1 wherein said assembly is a fuel cell assembly, the pair of adjacent gas porous plates are a pair of electrolyte reservoir plates, wherein the particles are carbon, and wherein the integral assembly has a voltage characteristic which is less than or equal to two and one-half millivolts per one-hundred amps per square foot (2.5 mV/100 ASF) and an electrolyte permeability of zero and a gas permeability characteristic which is less than six-hundredths of a cubic centimeter of nitrogen ($N_2$) per second per square foot (0.06 cc/sec-ft$^2$) at eight inches of water pressure differential.

4. The electrochemical cell assembly of claim 2 wherein said assembly is a fuel cell assembly, the pair of adjacent gas porous plates are a pair of electrolyte reservoir plates, wherein the particles are carbon, and wherein the integral assembly has a voltage characteristic which is less than or equal to two and one-half millivolts per one-hundred amps per square foot (2.5 mV/100 ASF) an electrolyte permeability of zero, and a gas permeability characteristic which is less than six-hundredths of a cubic centimeter of nitrogen ($N_2$) per second per square foot (0.06 cc/sec-ft$^2$) at eight inches of water pressure differential.

5. The electrochemical cell assembly of claim 2 wherein the particles are graphite, the concentration of particles in binder in the third layer is in the range of one and two-tenths to one and four-tenths (1.2–1.4) grams per cubic centimeter and the concentration of particles in binder in the first and second layers is one (1.0) gram per cubic centimeter.

6. The electrochemical cell assembly of claims 1, 2, 3, 4, or 5 wherein the particles disposed in said third layer are carbon particles in the form of graphite, the third layer is sixty to seventy weight percent graphite particles having a mean particle size $P_m$ of thirty-five microns and being passable through a mesh screen having a predetermined size.

7. The electrochemical cell assembly of claim 6 wherein the mesh screen is a one-hundred and forty sieve mesh screen.

8. The electrochemical cell assembly of claim 7 wherein the minimum particle size is two microns.

9. The electrochemical cell assembly of claim 8 wherein the distance between the porous plates is t and the mean particle size $P_m$ is less than or equal to one-half of the distance t ($P_m \leq t/2$).

10. The electrochemical cell assembly of claim 9 wherein the mean particle size $P_m$ is approximately twenty percent of the distance t and wherein the layer is approximately two-thirds by weight graphite particles.

11. The electrochemical cell assembly of claim 10, wherein the binder is selected from the group consisting of fluorinated ethylene-propylene (FEP Teflon), perfluoroalkoxy (PFA Teflon) resin and mixtures thereof.

12. The electrochemical cell assembly of claim 1 wherein the binder is any suitable polymer which has an acceptable thermal stability and chemical compatibility including polyethylene, fluorinated ethylene-propylene resin, perfluoroalkoxy resin, and mixtures thereof.

13. The electrochemical cell assembly of claim 12 wherein the binder is selected from the group consisting of fluorinated ethylene-propylene, perfluoroalkoxy resin, and mixtures thereof.

14. The electrochemical cell assembly of claim 2 wherein the binder is selected from the group consisting of fluorinated ethylene-propylene, perfluoroalkoxy resin, and mixtures thereof.

15. The electrochemical cell assembly of claim 3 wherein the binder is selected from the group consisting of fluorinated ethylene-propylene, perfluoroalkoxy resin, and mixtures thereof.

16. The electrochemical cell assembly of claim 4 wherein the binder is selected from the group consisting of fluorinated ethylene-propylene, perfluoroalkoxy resin, and mixtures thereof.

17. The electrochemical cell assembly of claim 5 wherein the binder is selected from the group consisting of fluorinated ethylene-propylene, perfluoroalkoxy resin, and mixtures thereof.

18. The electrochemical cell assembly of claim 6 wherein the binder is selected from the group consisting of fluorinated ethylene-propylene, perfluoroalkoxy resin, and mixtures thereof.

19. The electrochemical cell assembly of claim 6 wherein the binder penetrates a distance into each porous plate that which is equal to or greater than one-half of the thickness of the third layer.

* * * * *